Feb. 9, 1926.

A. S. TUÑEZ

Re. 16,261

WINDOW SASH

Original Filed June 30, 1923 2 Sheets-Sheet 1

WITNESS:

Robt R. Kitchel.

INVENTOR

Amable S. Tuñez

BY

Bussey & Harding

ATTORNEYS

Feb. 9, 1926.
Re. 16,261
A. S. TUÑEZ
WINDOW SASH
Original Filed June 30, 1923 2 Sheets-Sheet 2
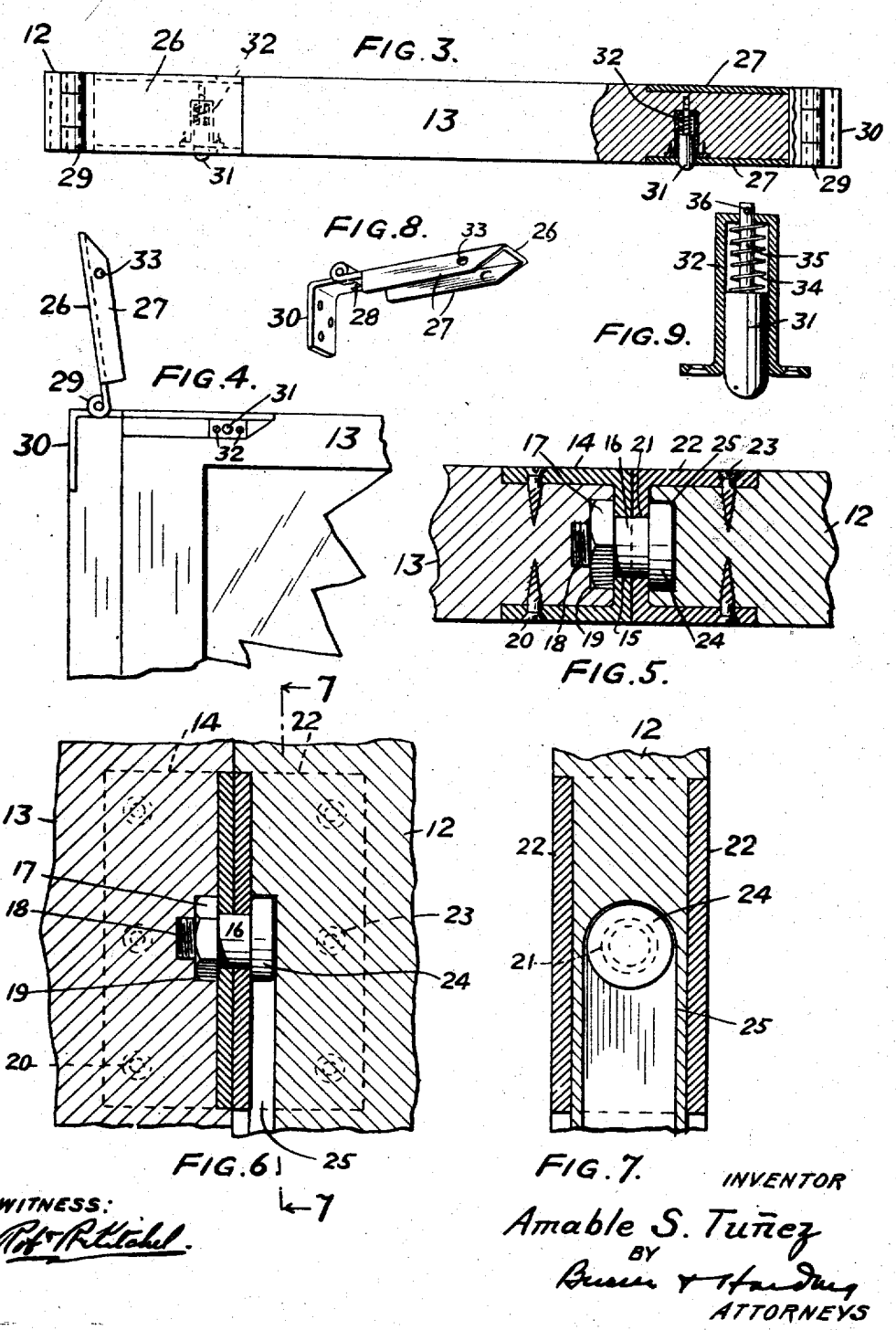
WITNESS:
INVENTOR
Amable S. Tuñez
BY
ATTORNEYS Reissued Feb. 9, 1926. Re. 16,261

UNITED STATES PATENT OFFICE.

AMABLE S. TUÑEZ, OF EASTON, PENNSYLVANIA, ASSIGNOR OF ONE-HALF TO MORRIS LEVIN, OF PHILADELPHIA, PENNSYLVANIA.

WINDOW SASH.

Original No. 1,521,409, dated December 30, 1924, Serial No. 648,759, filed June 30, 1923. Application for reissue filed May 14, 1925. Serial No. 30,374.

*To all whom it may concern:*

Be it known that I, AMABLE S. TUÑEZ, a citizen of the United States, residing at Easton, in the county of Northampton and State of Pennsylvania, have invented certain new and useful Improvements in Window Sashes, of which the following is a specification.

This invention relates to a window sash, and particularly to a construction wherein the sash is adapted to slide vertically in the frame in the usual manner and also to be swung into a horizontal plane when desired.

In previous constructions of this general character no provision has been made for a firm and rigid connection between the sliding stile members and the sash pivotally mounted thereon so that these parts were frequently liable to accidental disconnection and vibration under wind pressure which produce undesirable noises.

The present invention seeks to provide a construction wherein the sash member is firmly connected to the sliding stile and may be swung upon its pivot thereon so that the outer face of the sash is accessible from the interior of the room by a person standing on the floor.

The invention has for an object to provide a novel form of connecting or clip plate pivoted upon the sliding stile and embracing the upper edge of the sash to which it is secured by a detachable fastening.

A further object of the invention is to present an improved construction of hinge connection between the stile and the sash which permits an assemblage of the parts without the removal of the stile from the window frame and provides a tight and rigid pivot for bearing the weight of the sash when the latter is swung into a horizontal position.

Other and further objects of the invention will be hereinafter set forth and the novel features thereof defined by the appended claims.

In the drawings:

Figure 3 is a top plan of one sash with a portion in section;

Figure 4 is a detail elevation of the connecting clip between the stile and sash;

Figure 5 is an enlarged horizontal section on the line 5—5 of Figure 1;

Figure 6 is an enlarged vertical section of the pivotal mounting shown in Figure 1;

Figure 7 is a section on the line 7—7 of Figure 6;

Figure 8 is a detailed perspective of the connecting clip; and

Figure 9 is an enlarged section of the fastening device.

Like numerals refer to like parts throughout the several figures of the drawing.

Figures 1, 2:
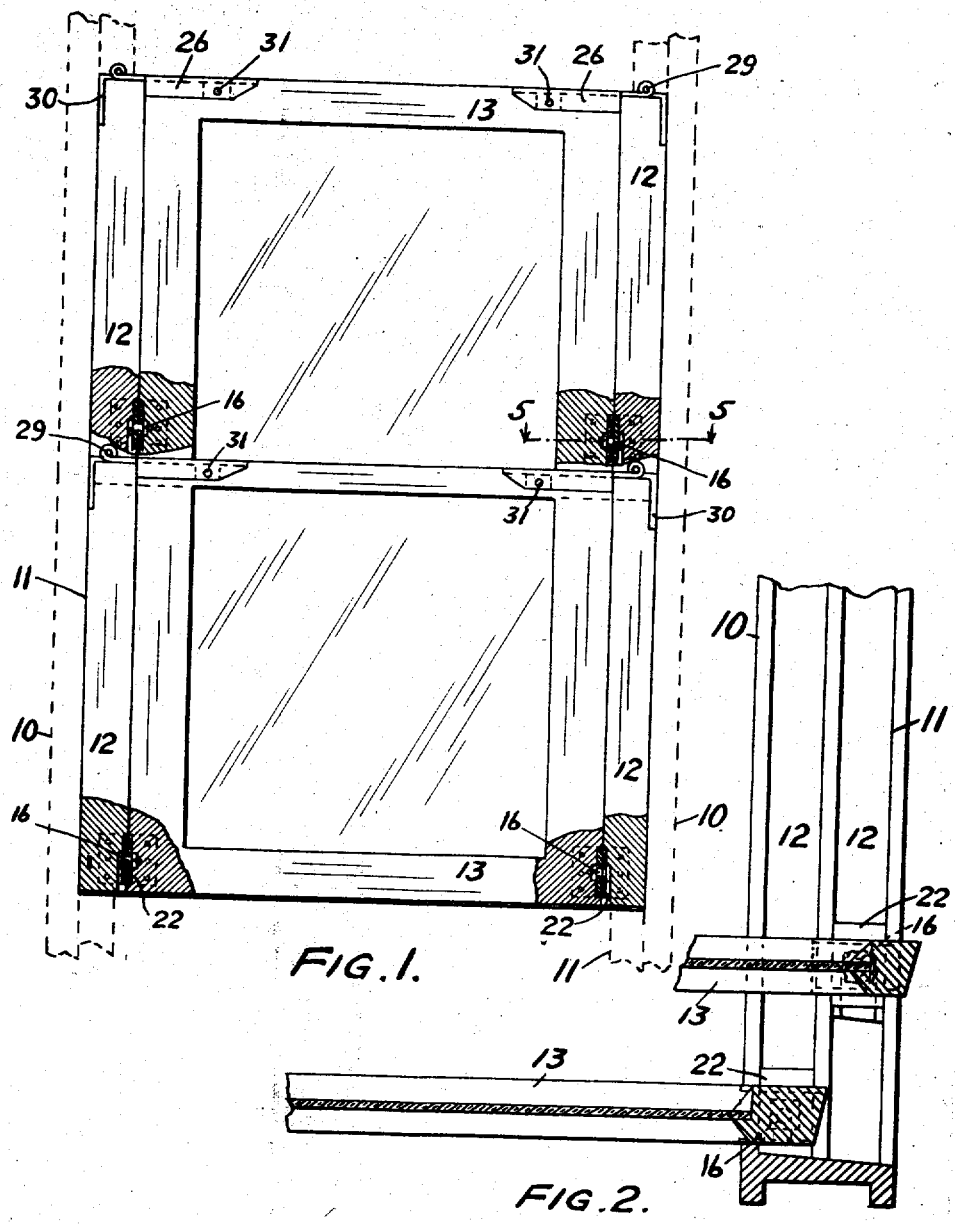
Figure 1 is an elevation of the invention applied with parts in section.
Figure 2 is a central vertical section with the sashes in horizontal position.

The numeral 10 designates a window frame which may be of any desired character and is provided with the usual sash grooves 11 in which the sliding stile members 12 are mounted. The sash 13 is pivotally connected to these at their lower portion by an improved construction of hinge, as shown in detail Figures 5, 6 and 7. This hinge comprises a clip member 14 embracing the edge of the sash and seated in a suitable countersunk recess. This clip is provided with a pivot aperture 15 through which the pivoting bolt 16 extends and is secured in position by a nut 17 disposed upon the threaded end 18 of the bolt. The nut and bolt end are disposed within a suitable recess 19 of the sash frame and the clip may be secured in position in any desired manner, for instance by attaching devices 20. The bolt also extends through a pivoting opening 21 in the clip plate 22 which embraces the stile 12 and is secured thereto by fastening devices 23. The bolt is also formed with a head 24 adapted to be introduced into a longitudinal channel 25 formed in the stile face. This construction permits of the convenient assemblage of the parts without removing the stile from the frame or disconnecting it from the usual balancing weights as the clip plates carrying the pivots are first attached to the sash and the pivot head then introduced into the channel 25, after which the clip plate is attached to the sides of the stile and a firm hinge is thus provided.

When the sash is in its normal position for vertical movement in the window frame it is interlocked with the stile by means of the connecting plate 26 which is formed of substantial U-shape having the depending wings 27 providing an elongated bearing contacting with the opposite faces of the sash so as to prevent any lateral movement thereof relative to the stile. This plate is formed at one end with a pivoting extension 28 mounted in the bearing 29 carried by the plate 30 attached to the upper end of the stile member 12. Various means may be used for retaining the connecting plate in contact with the stile but a desirable form thereof is shown in Figures 3 and 9 and comprises a pin 31 mounted in a casing 32 disposed in a suitable recess in the sash frame, said pin being adapted to extend into a cooperating seat or recess 33 in the connecting plate. This locking pin is normally projected outward by the tension spring 34 disposed between the base of the pin and the end of the casing, and for limiting the outward movement of the pin a shank 35 is extended therefrom through the base of the casing and provided with a cross pin 36 to limit the outward movement of the pin. It will be observed that in this construction when the connecting plate is swung into embracing relation with the sash frame the locking pin automatically enters the recess therein and retains the parts in firmly interlocked position until it be desired to release the same for swinging the sash into a horizontal position. The latter function is accomplished by merely depressing the pin to sufficient extent to permit the plate to be raised into the position shown in Figure 4 when the sash is free to be swung laterally of the stile. The construction of the connecting plate provides an efficient, simple and economically constructed means for an interlocked connection between the sash and stile by which the parts are supported against rattling or movement and operate as a firm unit in the vertical movement of the sash. When the sash is lowered and swung inward as shown in Figure 2 the outer face thereof is immediately accessible for washing or in case of painting or other repairs it is not necessary to use either a ladder or other means to reach the outer face of the sash.

While the specific details of the invention have been shown and described, changes and alterations may be made therein without departing from the spirit of the invention as defined by the following claims.

Having thus described my invention, what I claim as new and desire to secure by Letters Patent is:

1. In a window sash, a sliding stile pivoted thereto, a pivot plate carried by the upper portion of the stile, a connecting plate of a width substantially equal to the thickness of the sash, hinge lugs on both plates, the length of the combined hinge lugs being substantially equal to the thickness of the sash, and a hinge pin extending through the lugs, said pivot plate having a portion of channel cross-section to embrace the upper portion of the sash frame.

2. In a window sash, a sliding stile, pivoted thereto, a pivot plate carried by the upper portion of the stile, a connecting plate mounted on said pivot plate and having parallel wings to embrace the upper portion of the sash frame, and means to prevent pivotal movement of said plate relative to said frame.

3. In a window sash, a sliding stile pivoted thereto, a pivot plate carried by the upper portion of the stile, a connecting plate mounted on said pivot plate and having parallel wings to embrace the upper portion of the sash frame, and a spring actuated pin mounted in the frame and disposed to enter an aperture in one wing of the connecting plate when the latter is in engaging position.

4. In a window sash, a sliding stile having a longitudinal channel in its inner face, a connection between the stile and sash comprising embracing clips for each member having attaching means at the outer faces thereof, a pivot extending through an aperture in said clips and secured thereto, and a head upon said pivot adapted to be introduced into said channel in the stile.

5. In a window sash, a stile member provided with a longitudinal channel extending upward from the lower end thereof, a U-shaped pivoting clip mounted upon the sash, a cooperating clip mounted upon the stile to enclose said channel, a pivot bolt secured to the sash clip and a head upon said bolt adapted to travel in said channel.

In testimony whereof, I affix my signature at Easton, Pennsylvania, this 2nd day of May, 1925.

AMABLE S. TUÑEZ.